(12) United States Patent
Barkan et al.

(10) Patent No.: US 12,450,586 B2
(45) Date of Patent: Oct. 21, 2025

(54) BI-OPTIC INDICIA READER WITH IMPROVED WEIGH PLATTER

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 267 days.

(21) Appl. No.: 18/071,354

(22) Filed: Nov. 29, 2022

(65) Prior Publication Data

US 2024/0177130 A1 May 30, 2024

(51) Int. Cl.
*G06Q 20/20* (2012.01)
(52) U.S. Cl.
CPC .................................. *G06Q 20/208* (2013.01)
(58) Field of Classification Search
CPC .................................................... G06Q 20/208
USPC ......................................................... 235/435
See application file for complete search history.

(56) References Cited

U.S. PATENT DOCUMENTS

| | | | |
|---|---|---|---|
| 11,941,479 B1 * | 3/2024 | Barkan | G06K 7/10722 |
| 2021/0199488 A1 * | 7/2021 | O'Donnell | G01G 23/36 |
| 2024/0153361 A1 * | 5/2024 | Thompson | G06V 20/52 |
| 2024/0220999 A1 * | 7/2024 | Gao | G06Q 20/208 |

\* cited by examiner

*Primary Examiner* — Allyson N Trail
(74) *Attorney, Agent, or Firm* — Yuri Astvatsaturov

(57) ABSTRACT

At least some embodiments of the present invention are directed to weigh platters for use with in-counter indicia readers. In an embodiment the present invention is a weigh platter for use with a indicia reader having a housing with a lower housing portion with an upper surface facing a product scanning region and an upper housing portion extending above the lower housing portion. The weigh platter includes (i) a central region extending in a transverse plane, the central region including a platter window configured to permit light to pass therethrough, the platter window having a transparent medium having a top surface extending parallel to the transverse plane and (ii) a proximal region positioned between the platter window and the upper housing portion, where the proximal region includes a proximal region surface that extends above the platter window and that is obliquely angled relative to the transverse plane.

20 Claims, 3 Drawing Sheets

BI-OPTIC INDICIA READER WITH IMPROVED WEIGH PLATTER

BACKGROUND

Multi-planar, or otherwise known as bi-optic, indicia readers are commonplace in the retail industry. These indicia readers generally comprise a lower base portion and a raised tower portion. In many implementations the base portion doubles as a scale with a weigh platter forming the top of the base portion. In practice, produce is typically placed on this platter and the weight of the produce is recorded for further transaction processing.

While this basic setup works in many cases, instances where large produce is being weighed or where produce is placed non-centrally on the platter becomes problematic. Specifically, portions of the item that is being weighed may come to rest on a surface that is not connected to the load cell of the scale. For example, sometimes this may be the side-counter of the workstation where the reader is installed. Other times this could be the raised portion of the bi-optic indicia reader. In such instanced, due to a portion of the weight being supported by something other than a load cell, the scale does not register an accurate weight, reporting a weight that is less than the weight of the actual item. Capturing such inaccurate weight could lead problems like incorrectly charging consumers and/or improper accounting for store inventory.

Existing solutions have addressed this problem by proving a platter that extends not only over the top of the base portion, but also vertically along the front of the raised portion of the bi-optic and horizontally over the top of the raised portion. Though effective to some extent, such design has inherent problems related to the quality of images captured by the optical components of the reader. Specifically, the use of the aforementioned design requires a vertical window to enable the field of view (FOV), that normally extends through the raised portion of the housing, to continue unimpeded. However, adding the vertical window, and the transparent medium like glass that goes therein, creates a configuration that is considerably more susceptible to creating internal reflections from the bi-optic's own illumination system, reflections that could appear on the captured images leading to reduced image quality and an impedance of the reader's ability to effectively decode indicia. Thus, there exists a need for further bi-optic platter designs that can help address the aforementioned problems.

SUMMARY

Accordingly, at least some embodiments of the present invention are directed to addressing the problems laid out above.

In an embodiment, the present invention is a indicia reader that includes: a housing having a lower housing portion with an upper surface facing a product scanning region and an upper housing portion extending above the lower housing portion; and a weigh platter configured to support an object placed on the weigh platter for obtaining a weight of the object, the weigh platter having: a central region extending in a transverse plane, the central region including a platter window configured to permit light to pass therethrough, the platter window having a transparent medium having a top surface extending parallel to the transverse plane; and a proximal region positioned between the platter window and the upper housing portion; and wherein the proximal region includes a proximal region surface that extends above the platter window and that is obliquely angled relative to the transverse plane.

In another embodiment, the present invention is a weigh platter for use with a indicia reader having a housing with a lower housing portion with an upper surface facing a product scanning region and an upper housing portion extending above the lower housing portion. The weigh platter includes: a central region extending in a transverse plane, the central region including a platter window configured to permit light to pass therethrough, the platter window having a transparent medium having a top surface extending parallel to the transverse plane; and a proximal region positioned between the platter window and the upper housing portion, wherein the proximal region includes a proximal region surface that extends above the platter window and that is obliquely angled relative to the transverse plane.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
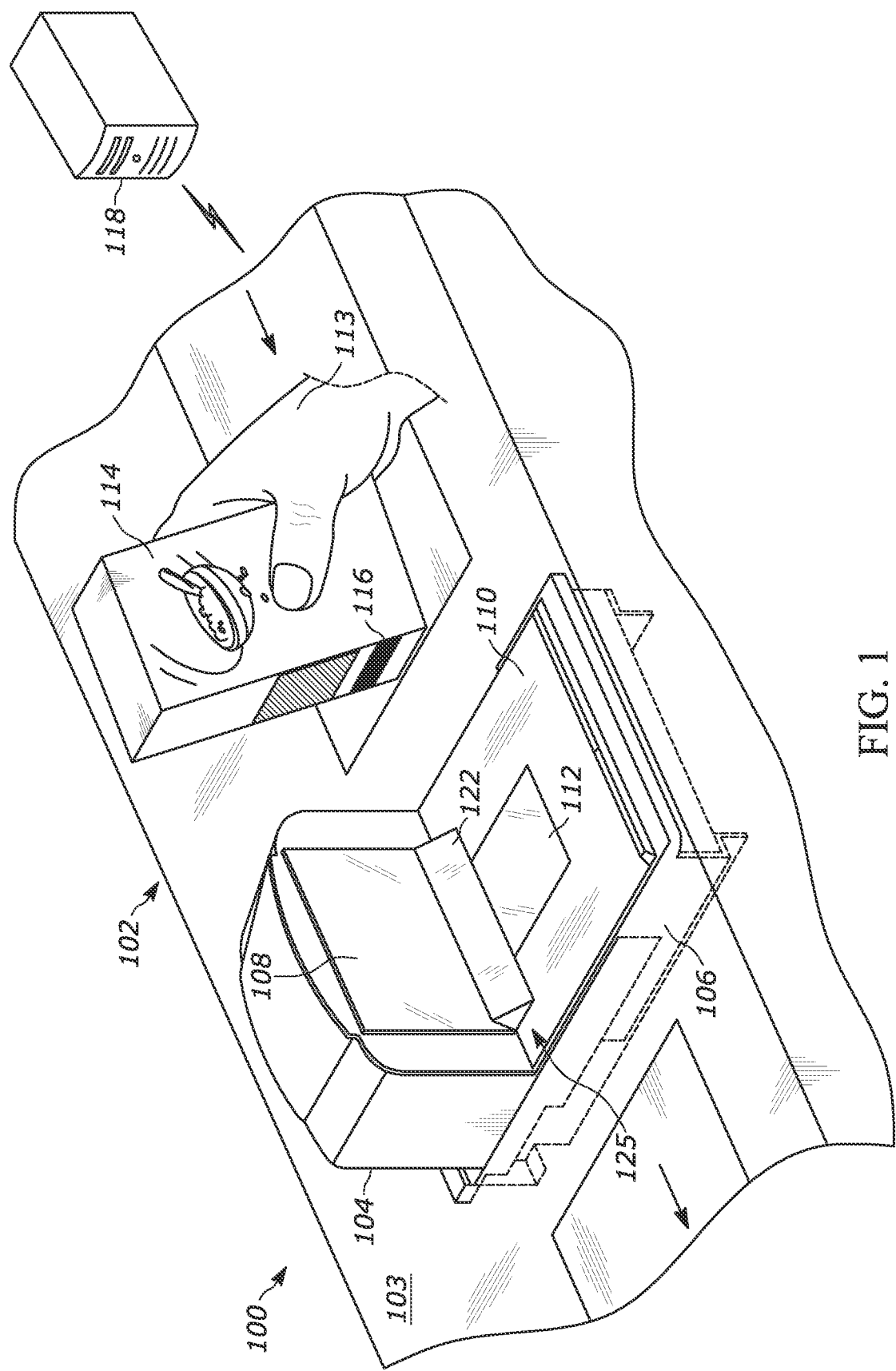
FIG. 1 is a perspective view of an example indicia reader for using weigh platters in accordance with various embodiments of the present invention.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

FIG. 1 illustrates a perspective view of an example bi-optic indicia reader 100 operable to utilize weigh platters in accordance with embodiments of the present disclosure. As used herein, the term indicia should be understood to refer to any kind of visual marker that can be associated with an item. For example, indicia can be a 1D, 2D, or 3D barcode, a graphic, a logo, etc. Additionally, indicia may comprise encoded payload data as, for example, is the case with a 1D or 2D barcode where the barcode encodes a payload comprised of, for example, alphanumeric or special characters that may be formed into a string. In the illustrated example, the bi-optic indicia reader 100 is shown as part of a point-of-sale (POS) system arrangement 102 having the bi-optic indicia reader 100 positioned within a workstation counter 103. Generally, the indicia reader 100 includes an upper housing 104 (also referred to as an upper portion, upper housing portion, or tower portion) and a lower housing 106 (also referred to as a lower portion, lower housing portion, or platter portion). The upper housing 104 can be characterized by an optically transmissive window 108 positioned therein along a generally vertical plane and a horizontally extending field of view(s) which passes through the window 108. The lower housing 106 can be characterized by a weigh platter 110 that includes an optically transmissive window 112 positioned therein along a generally horizontal plane and a vertically extending field of view(s) which passes through the window 112. The weigh platter 110 is a part of a weigh platter assembly that generally includes the weigh platter 110 and a scale (or load cell) configured to measure the weight of an object placed the top surface of the weight platter 110.

In operation, the indicia reader 100 can be used in multiple modes, including a mode where item-related data is passed to a point-of-sale (POS) host device based on the weight of an item involved in a transaction and a mode where item-related data is passed to a POS host device without regard for the weight of an item involved in a transaction.

In the latter mode, a user 113 generally passes an item 114 across a product scanning region of the indicia reader 100 in a swiping motion in some general direction, which in the illustrated example is right-to-left. A product scanning region can be generally viewed as a region that extends above the platter 110 and/or in front of the window 108 where indicia reader 100 is operable to capture image data of sufficient quality to perform imaging-based operations like decoding indicia that appears in the obtained image data. It should be appreciated that while items may be swiped past the indicia reader 100 in either direction, items may also be presented into the product scanning region by means other than swiping past the window(s). When the item 114 comes into the any of the fields of view of the reader, the indicia 116 on the item 114 is captured and decoded by the indicia reader 100, and corresponding data is transmitted to a communicatively coupled host 118 (commonly comprised of a point of sale (POS) terminal).

Indicia reader 100 can utilize a variety of imaging assemblies and optical components to achieve the desired field of view(s) FOV(s) over which image data can be captured and transmitted to a processing host (such as a decoder, processor, or ASIC that may be internal to the indicia reader 100) for decoding of indicia and further utilization of the decoded payload data. For example, an imaging assembly may include an image sensor (also referred to as an imager or imaging sensor) that can be, for example, a CCD or a CMOS imaging sensor and may either be a linear or a two-dimensional sensor. Linear image sensors generally include multiple photosensitive pixel elements aligned in a one-dimensional array. Two-dimensional sensors generally include mutually orthogonal rows and columns of photosensitive pixel elements arranged to form a substantially flat square or rectangular surface. Such imagers are operative to detect light captured by an imaging lens assembly along a respective optical path or axis that normally traverses through either of the generally horizontal or generally upright window(s). In instances where multiple imaging assemblies are used, each respective imager and imaging lens assembly pair is designed to operate together for capturing light scattered, reflected, or emitted from indicia as pixel data over a respective FOV. In other instances, a single imaging assembly may be used to generate a single primary FOV which may be split, divided, and/or folded to generate multiple FOVs. In such cases, data collected from various portions of the imaging sensor may be evaluated as if it was obtained by an individual imaging assembly/imaging sensor.

Returning to the various modes of use for the indicia reader 100, some items that are transacted for require a weight determination. These typically involve items like, for example, produce the price of which may be determined based on a cost-per-weight value. In such cases the type of item can often be determined in a number of ways. For instance, indicia attached to the produce may be scanned to help identify the item, the item may be recognized with the assistance of vision analysis, and/or by way of user input at the POS host device. However, in addition to identifying the item, to complete the transaction the item weight must be determined. This is done by placing the item on the top surface of the platter 110 (which in-turn is connected to a load cell of scale assembly) and reporting the determined weight after the weight has settled.

Although in many instances the weighing of an item can be accomplished with relative ease, in many other cases larger items which don't easily fit within the confines of a typical weight platter or loser items like a bag of apples, can come in contact with surfaces other than the weigh platter, causing a portion of the item's overall weight to not be registered resulting a weight-under reporting. This issue may be mitigated by using the weigh platter 110, as disclosed by the various embodiments described herein.

Figure 2:
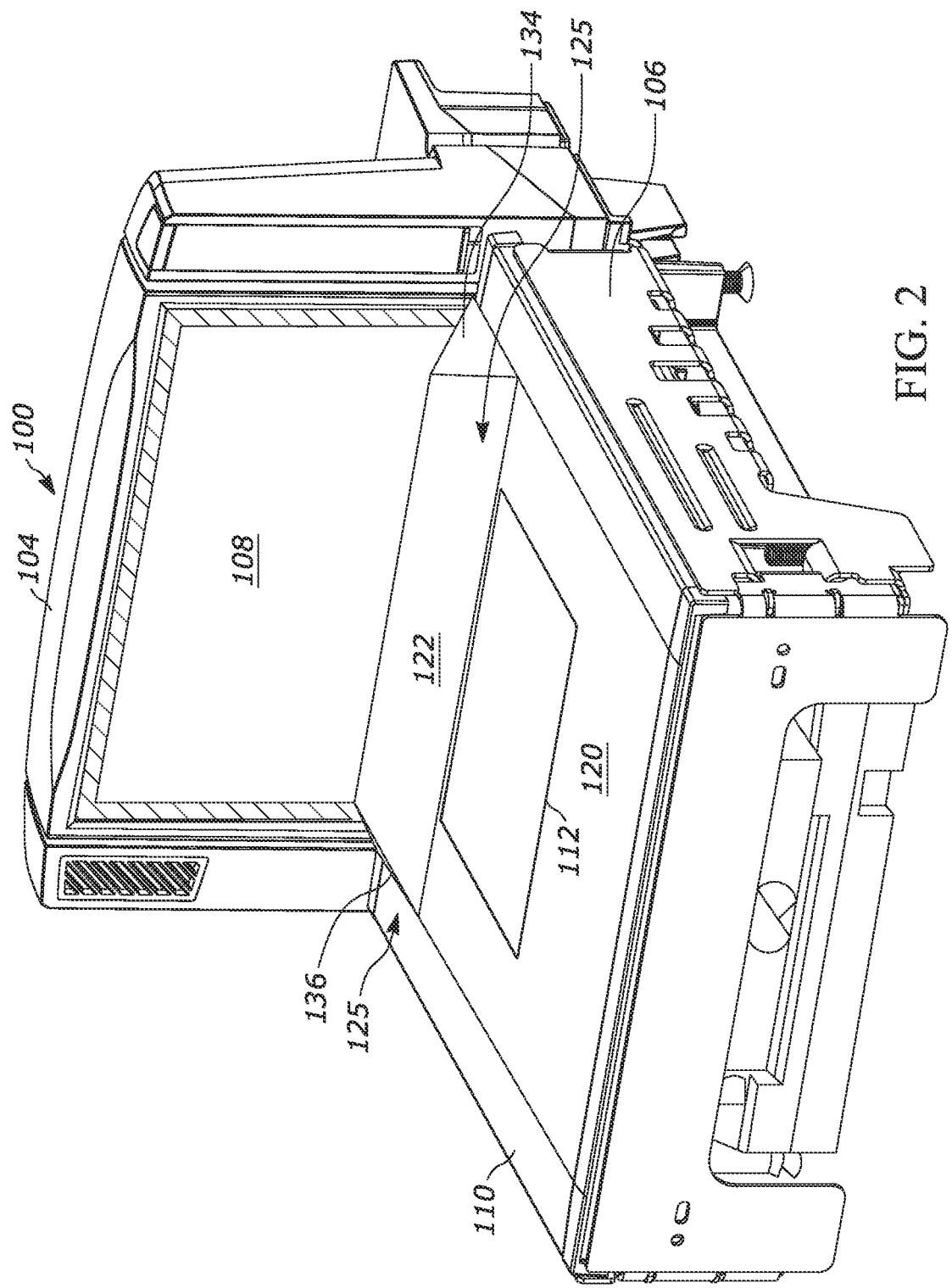
FIG. 2 is a top-perspective view of the example indicia reader of FIG. 1.
Figure 3:
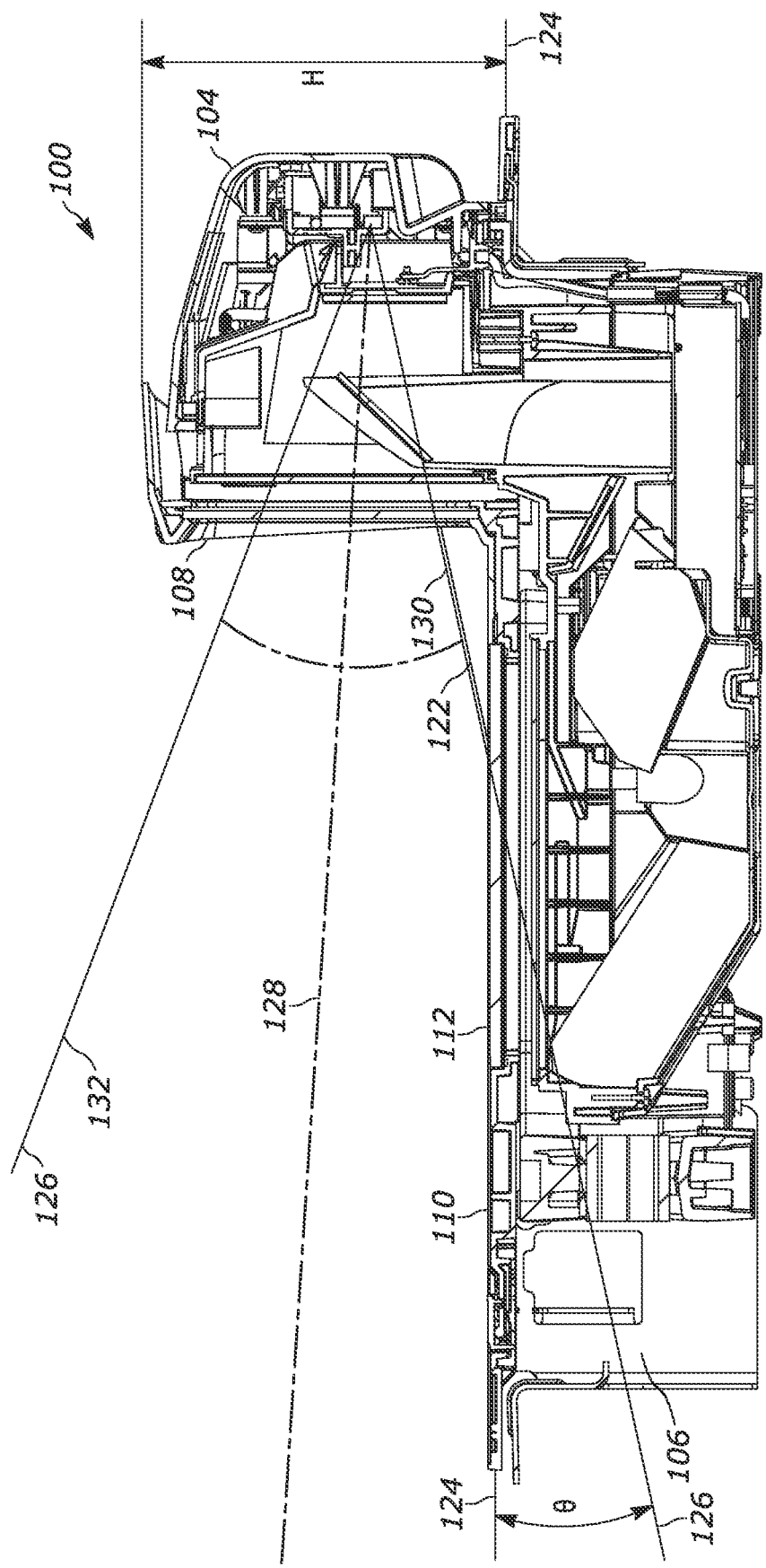
FIG. 3 is a side cross-section view of the example indicia reader of FIG. 2

Referring to FIGS. 2 and 3, shown therein is a more-detailed example of the platter 110 together with the reader 100. Platter 110 includes a central region 120, that extends in a transverse plane, with a platter window 112 that permits light to pass therethrough. Commonly, the indicia reader 100 will have an imaging assembly that has, associated therewith, a FOV that extends through the platter window 112 in a generally upward direction. To permit image data to be captured over that FOV, light should be able to pass, mostly unimpeded, from a product scanning region above the platter 110 to the imaging sensor. This is achieved with the help of the window 112 which provides a path, by way of an aperture, for said light to enter into the lower housing 106 and ultimately reach the image sensor of a respective imaging assembly.

To maintain the integrity of the internal components, the window 112 includes some kind of a transparent medium with, in preferred embodiments, a top surface extending parallel to the transverse plane. In some embodiments, this medium is comprised of mineral glass. In other embodiments, the medium is comprised of sapphire glass. It should be appreciated that due to its scratch-resistant properties, use of sapphire glass may be preferred over mineral glass. The transparent medium is integrated into the rest of the platter 110, creating a seal and preventing debris and/or liquids from reaching the area directly below the platter 110.

While the use of the platter 110 (together with the transparent medium in the window 112) can help prevent debris from entering the interior cavity of the indicia reader, it will be appreciated that to obtain accurate weight of objects the platter needs to have some, and preferably unrestricted, movement relative to the lower housing 106. Thus, additional environmental sealing is preferably provided by the lower portion 106 whereby another window with another transparent medium may be provided under the window 112. Whereas the top of the platter 110 is likely to see a significant amount of contact during use, the portions under the platter 106 are not. Therefore, in some instances it may be preferable to use a transparent medium like mineral glass under the patter 110 which could be more economical than, for example, sapphire glass.

In some embodiments, platter 110 may be removable from the rest of the indicia reader 100 whereby the platter 110 and/or the area under the platter 110 may be cleaned. In other examples, the platter may be non-removably attached to the rest of the indicia reader 100.

To help prevent items that are being weighed on the platter 110 from coming in contact with portions of the upper housing 104 and thereby causing an improper reporting of the weight, the platter 110 includes a surface 122 that that extends above the platter window 112 and that is obliquely angled relative to the transverse plane 124 defined by the window 112. In various embodiments, the surface 122 is positioned in the proximal region 125 of the platter 110 that generally extends between the window 112 and the upper housing 104 when the platter 110 is installed in the indicia reader 110.

To maintain a sufficient incline on the surface 122, at its far end (near the upper housing 104) the surface 122 extends in an upward direction. As measured against the height H of the upper housing 104 (from the transverse plane 124 to the top of the upper housing 104), in some embodiments surface 122 extends no higher than half of said height. In other embodiments, surface 122 extends no higher than one third of the upper housing height.

In some instances, the height limitation may be driven by the dimensions and/or boundaries of one or more FOVs that pass through the generally upright window 108. To help effectively capture image data related to items that are presented to the indicia reader 100, the indicia reader may include one or more imaging assemblies which generate one or more FOVs through the window 108. Through these FOVs, the indicia reader 100 is capable of capturing image data that is supplemental to the image data collected through any FOVs that may be directed through the window 112 of the platter 110. Having access to this additional image data helps improve decoding functionally and allows users to present items for scanning at a relatively wide range of orientations. Additionally, imaging assemblies with their FOVs directed through the window 118 may be used for user identification, shrink detection, wake-up purposes, and other use cases where data captured over a generally horizontal FOV may be of great value. Hence, it may be important to avoid obstructing any FOV that is directed through the window 118.

Referring to FIG. 3, shown therein is a cross-section of an exemplary FOV 126 that is directed through the window 118. FOV 126 includes a central imaging axis 128 that can be understood to be directed in a generally horizontal direction. This should further be understood to extend to the entire FOV whereby a reference to a FOV being directed in a generally horizontal direction can be understood to mean that the FOV's central axis is directed in the generally horizontal direction. In some embodiments, a generally horizontal direction can be understood to mean a direction along an axis that is within 35 degrees of horizontal. In some examples, since the indicia reader 100 is likely to be considered for use with its platter extending along a horizontal plane, a reference to horizontal may also be understood as being parallel to the transverse plane 124. The FOV 126 also includes a lower boundary 130, an upper boundary 132, and two lateral boundaries extending between the lower boundary and the upper boundary (not shown). These boundaries are shaped such that a cross-section of the FOV taken along a plane that is normal to the FOV's imaging axis will have either a rectangular or a square shape.

To avoid blocking any portion of the FOV 126 (and specifically the lower portion as that is the portion that is closest to the surface 122 of the platter 110, the proximal region surface 122 is positioned below the lower boundary 130 of the FOV 126 as the lower boundary 130 extends directly above the proximal region surface 122. In some implementations, the space between the lower boundary 130 and the surface 122 is minimized. For example, the space between the lower boundary 130 and the surface 122, as measured along a vertical axis normal to the transverse plane 124, is no greater than 15 mm. This reduction in available space can have a beneficial effect as users of the indicia reader will be prevented from placing items in regions where image data, as it relates to that item, cannot be obtained. In other words, this reduction in available space can help avoid positioning items outside the FOV 126.

Additionally, in some embodiments is may be beneficial to maintain the same angle between the surface 122 and the lower boundary 130. This could be seen in the cross-section of FIG. 3 where both the surface 122 and the lower boundary 130 track along the same angle θ such that the planes along which each of the lower boundary 130 and the surface 122 are substantially parallel or they extend along angles that are substantially the same relative to the transverse plane 124.

As the FOV 126 is not expected to pass through the surface 122, in preferred embodiments said surface is comprised of some opaque material such as some metallic or composite material that is likely to retain its shape without breakage through repeated use where such use involved coming in contact with items that are being transacted for. Along those lines, the surface 122 may also be covered or otherwise have an overlay comprised of a substantially resilient material like sheet-metal or composite.

Referring back to FIG. 2, in at least some embodiments the surface 122 is formed by a substantially flat surface that extends through a majority of the proximal region 124. In some embodiments, the use of the term "substantially flat" may mean without substantial protrusions or recesses that would cause an obstruction for items being moved across the surface. In some embodiments the use of the term "substantially flat" may mean that deviations from a plane that is defined by the overall surface 122 do not exceed 5 mm. Having a flat surface, like the substantially flat surface 122 can create a convenient surface to drag items over while at the same time creating a ramp that helps prevent items from reaching the upper portion of the indicia reader and helps items to return to the central region of the platter 110 by forcing those items to roll back towards the window 112. In certain embodiments, the surface 112 is angled anywhere between 5 degrees and 65 degrees relative to the transverse plane 124, with a preferred angle being between 10 degree and 30 degrees. However, it should also be appreciated that non-flat or irregular surfaces may also form surface 122 so long as those surfaces are within the parameters laid out in the subject disclosure.

While the surfaces are not required to be flat in all embodiments, the example shown in FIG. 2 illustrates the proximal region 124 forming a wedge shape. This wedge includes a first wedge surface (formed by surface 122) facing the product scanning region of the indicia reader, a second surface 134 facing one lateral side of the indicia reader 100, and a third surface 136 facing another lateral side of the indicia reader. To void creating obtrusive features for items that are being carried or dragged across the platter 110, each of the second surface 134 of the wedge and the third surface 136 of the wedge is oriented at an oblique angle relative to the transverse plane 124. For example, this angle may be anywhere between 35 degrees and 80 degrees. Additionally, to help smooth transitions between various surfaces of the platter, joints between various surfaces may be rounded and/or curved to prevent items from being snagged or damaged while being scanned. Along those line, in some embodiments a majority of an upper region of the weigh platter that excludes the proximal region is substantially parallel with the transverse plane. This again can help with moving items across the platter in an unimpeded manner.

Although the wedge shape is illustrated as being integral with the platter 110, in some embodiments such a wedge may be a field-upgradable feature such that it is removable from the platter 110 allowing the platter to be flat in the proximal region 125.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An indicia reader comprising:
a housing having a lower housing portion with an upper surface facing a product scanning region and an upper housing portion extending above the lower housing portion; and
a weigh platter configured to support an object placed on the weigh platter for obtaining a weight of the object, the weigh platter having:
a central region extending in a transverse plane, the central region including a platter window configured to permit light to pass therethrough, the platter window having a transparent medium having a top surface extending parallel to the transverse plane; and
a proximal region positioned between the platter window and the upper housing portion; and
wherein the proximal region includes a proximal region surface that extends above the platter window and that is obliquely angled relative to the transverse plane.

2. The indicia reader of claim 1, wherein the proximal region surface extends less than half a height of the upper housing portion as measured from the transverse plane to a top of the upper housing portion.

3. The indicia reader of claim 1, wherein the proximal region surface extends less than one third a height of the upper housing portion as measured from the transverse plane to a top of the upper housing portion.

4. The indicia reader of claim 1, further comprising an imaging assembly having a field of view (FOV) directed through a generally upright window of the upper housing portion, the FOV having a lower boundary, an upper boundary, and two lateral boundaries extending between the lower boundary and the upper boundary,
wherein the proximal region surface is positioned below the lower boundary of the FOV as the lower boundary of the FOV extends directly above the proximal region surface.

5. The indicia reader of claim 1, wherein the proximal region surface is comprised of an opaque material.

6. The indicia reader of claim 1, wherein the proximal region surface is a substantially flat surface that extends through a majority of the proximal region.

7. The indicia reader of claim 6, wherein the proximal region surface is angled between 5 degrees and 65 degrees relative to the transverse plane.

8. The indicia reader of claim 1, wherein the proximal region includes a wedge having a first wedge surface facing a product scanning region of the indicia reader, a second surface facing one lateral side of the indicia reader, and a third surface facing another lateral side of the indicia reader, and
wherein the first wedge surface is formed by the proximal region surface.

9. The indicia reader of claim 8, wherein each of the second surface of the wedge and the third surface of the wedge is oriented at an oblique angle relative to the transverse plane.

10. The indicia reader of claim 8, wherein the wedge is removable attached to the weigh platter.

11. A weigh platter for use with an indicia reader having a housing with a lower housing portion with an upper surface facing a product scanning region and an upper housing portion extending above the lower housing portion, the weigh platter comprising:
a central region extending in a transverse plane, the central region including a platter window configured to permit light to pass therethrough, the platter window having a transparent medium having a top surface extending parallel to the transverse plane; and a proximal region positioned between the platter window and the upper housing portion, wherein the proximal region includes a proximal region surface that extends above the platter window and that is obliquely angled relative to the transverse plane.

12. The weigh platter of claim 11, wherein the proximal region surface extends less than 40 mm above the transverse plane.

13. The weight platter of claim 11, wherein the proximal region surface extends between 30 mm and 10 mm above the transverse plane.

14. The indicia reader of claim 11, wherein the indicia reader further includes an imaging assembly having a field of view (FOV) directed through a generally upright window of the upper housing portion, the FOV having a lower boundary, an upper boundary, and two lateral boundaries extending between the lower boundary and the upper boundary, and wherein the proximal region surface is configured to be positioned below the lower boundary of the FOV as the lower boundary of the FOV extends directly above the proximal region surface.

15. The weight platter of claim 11, wherein the proximal region surface is comprised of an opaque material.

16. The weight platter of claim 11, wherein the proximal region surface is a substantially flat surface that extends through a majority of the proximal region.

17. The weigh platter of claim 16, wherein the proximal region surface is angled between 5 degrees and 65 degrees relative to the transverse plane.

18. The weigh platter of claim 11, wherein the proximal region includes a wedge having a first wedge surface configured to face a product scanning region of the indicia reader, a second surface configured to face one lateral side of the indicia reader, and a third surface configured to face another lateral side of the indicia reader, and wherein the first wedge surface is formed by the proximal region surface.

19. The weigh platter of claim 18, wherein each of the second surface of the wedge and the third surface of the wedge is oriented at an oblique angle relative to the transverse plane.

20. The weigh platter of claim 11, wherein a majority of an upper region of the weigh platter that excludes the proximal region is substantially parallel with the transverse plane.

* * * * *